A. J. TRIGWELL.
FRICTIONAL TRANSMISSION MECHANISM.
APPLICATION FILED SEPT. 18, 1916.

1,246,359.

Patented Nov. 13, 1917.
2 SHEETS—SHEET 1.

INVENTOR
Alfred J. Trigwell
BY John A. Naismith
HIS ATTORNEY

A. J. TRIGWELL.
FRICTIONAL TRANSMISSION MECHANISM.
APPLICATION FILED SEPT. 18, 1916.

1,246,359.

Patented Nov. 13, 1917.
2 SHEETS—SHEET 2.

INVENTOR
Alfred J. Trigwell
By John A. Naismith
HIS ATTORNEY

UNITED STATES PATENT OFFICE.

ALFRED J. TRIGWELL, OF SAN JOSE, CALIFORNIA.

FRICTIONAL TRANSMISSION MECHANISM.

1,246,359.  Specification of Letters Patent.  Patented Nov. 13, 1917.

Application filed September 18, 1916. Serial No. 120,711.

*To all whom it may concern:*

Be it known that I, ALFRED J. TRIGWELL, a subject of the King of Great Britain, and resident of San Jose, in the county of Santa Clara and State of California, have invented certain new and useful Improvements in Frictional Transmission Mechanisms, of which the following is a specification.

My invention relates to frictional transmission mechanisms for motor driven vehicles, and the object of my invention is to provide a frictional transmission mechanism particularly for use with tractors that can be quickly and easily adjusted for any desired speed within the capabilities of the same, and quickly and easily manipulated to drive said tractor in any desired direction. Another object of my invention is to provide a frictional transmission mechanism that will be practical in operation and yet will materially reduce the cost of installation and upkeep of this portion of the driving mechanism.

With these and other objects in view my invention consists in the novel and useful provision, formation, construction, combination, relative arrangement and interrelation and association of parts, members and features all as hereinafter described, shown in the drawings and finally pointed out in the claims.

In the drawings, in which similar characters of reference refer to similar parts throughout the several views, Figure 1 is a plan view of my improved frictional transmission mechanism in position on a tractor frame and geared to internal gears in the tractor wheels, parts broken away.

Figure 6:
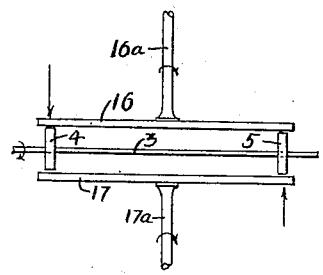
Fig. 6 is a diagrammatic plan view of my improved mechanism illustrating where pressure is applied to the disks to secure a backward movement.
Figure 1:
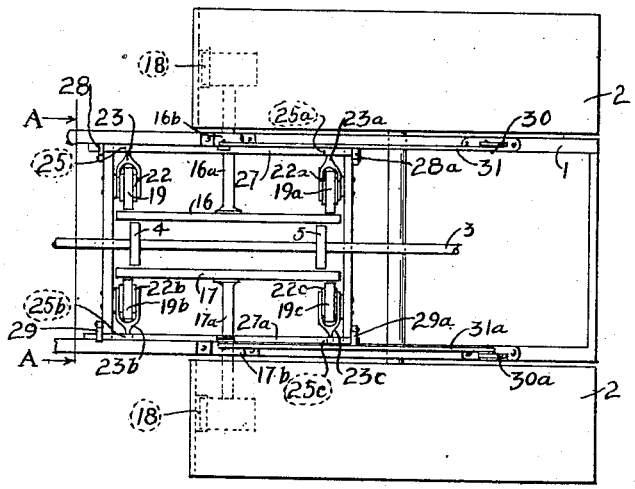

Referring now more particularly to the drawings, 1 indicates the main frame of a tractor, 2 the wheels which carry said frame 1, and 3 the driving shaft connected to driving mechanism not shown. Friction wheels 4 and 5 are slidably mounted on shaft 3 by means of keys and keyways 6 and 7 respectively, and are slidably positioned by means of shifting members 8 and 9 respectively which are mounted upon a shaft 10 revolved in bearings 11 and 12 by wheel 13 and provided with reverse threads as indicated at 14 and 15 respectively. When wheel 13 is turned therefore, friction wheels 4 and 5 are caused to move toward or away from each other at a uniform rate of speed and thereby provide a speed changing mechanism.

Revolubly mounted on frame 1 are opposed disks 16 and 17 on shafts $16^a$ and $17^a$ in their respective bearings $16^b$ and $17^b$, so spaced as to engage friction wheels 4 and 5 when subjected to a suitable pressure from the rear, and geared to internal gears in tractor wheels 2 as indicated at 18. The method of securing the desired contact of disks and friction wheels will now be described, and since the four contact wheels and correlated parts are substantially alike but one will be described in detail and the remaining ones given a corresponding number in conjunction with its proper letter. The four contact wheels are designated as 19, $19^a$, $19^b$ and $19^c$ respectively.

Contact wheel 19 is mounted on shaft 20 which is eccentrically mounted in bearing 21, bearing 21 being revolubly mounted in bracket 22 which is in turn securely mounted on frame 1. Forked arm 23 is adjustably mounted on bearing 21, the adjusting device in the present instance comprising a plurality of semicircular bores in the outer edge of bearing 21, a single semicircular bore in the inner circumference of the engaging portion of arm 23 and a fillister headed screw adapted to engage said single bore and one of said plurality of bores as shown at 24. As wheel 19 wears away the loss can be taken up by advancing bearing 21 one hole. The outer end of forked arm 23 is provided with a roller 25 adapted to operate in slot 26 in cam slide 27. Cam slide 27 is slidably positioned in guides 28 and 28ª respectively which are rigidly mounted on frame 1, and is operated by a lever 30 pivotally connected thereto by link 31. In the present instance the slots in cam slide 27 are formed substantially as shown in the lower portion of Fig. 8 for operating contact wheels 19 and 19ª, and as shown in the upper portion of said figure for operating contact wheels 19ᵇ and 19ᶜ.

Figure 8:
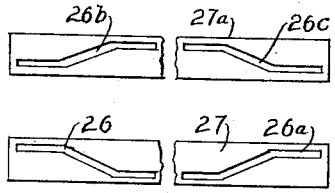
Fig. 8 illustrates the form of cam slides used when my improved mechanism is geared to the internal gears of the tractor wheels.
Figure 2:
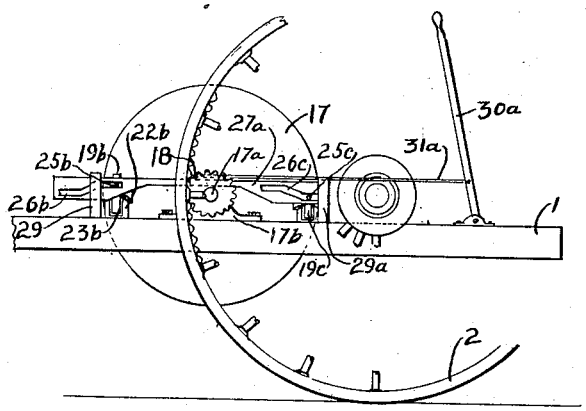
Fig. 2 is a side elevation of the same.

When cam slides formed as shown in Fig. 8 are used, throwing lever 30ª forward has the following result:—Cam slide 27ª is moved forward and consequently roller 25ᵇ is forced to travel upward in slot 26ᵇ. The upward movement of roller 25ᵇ turns bearing 21ᵇ a distance sufficient to throw contact wheel 19ᵇ (which is mounted eccentrically therein) forward against the outer surface of disk 17, thereby pressing the inner surface of said disk against friction wheel 4 and setting said disk wheel 17 in motion. The form of slot 26ᶜ is the reverse of that of slot 26ᵇ consequently the forward movement of cam slide 27ª reverses the movement of contact wheel 19ᶜ and the same is released from contact with disk wheel 17.

Figure 7:
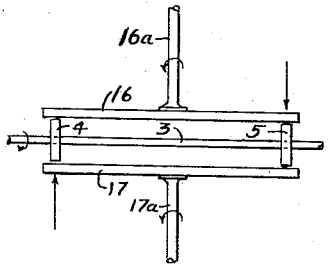
Fig. 7 is a diagrammatic plan view of my improved mechanism illustrating where pressure is applied to the disks to secure a forward movement.

The forward movement of cam slide 27 through the action of lever 30 operates contact wheels 19 and 19ª in the same manner as above described but owing to the reverse form of slots 26 and 26ª contact wheel 19 is thrown out of use and contact wheel 19ª is thrown into use. The contacts secured by the above described operations are illustrated diagrammatically in Fig. 7 and drive the vehicle forward, while the backward movement of both levers 30 and 30ª secure the contacts illustrated in Fig. 6 and the vehicle is driven backward.

It of course naturally follows that by throwing cam slide 27 forward and cam slide 27ª backward contact wheels 19ª and 19ᶜ are thrown into use and both disks pressed against friction wheel 5 and consequently driven in opposite directions and the vehicle is turned to the left. If both cam slides are now reversed and contact wheels 19 and 19ᵇ are used then the vehicle is turned to the right.

Figure 9:
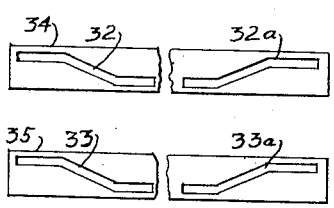
Fig. 9 illustrates the form of cam slides used when my improved mechanism is geared to the internal gear of one tractor wheel and to a gear secured to the hub of the other tractor wheel.
Figure 5:
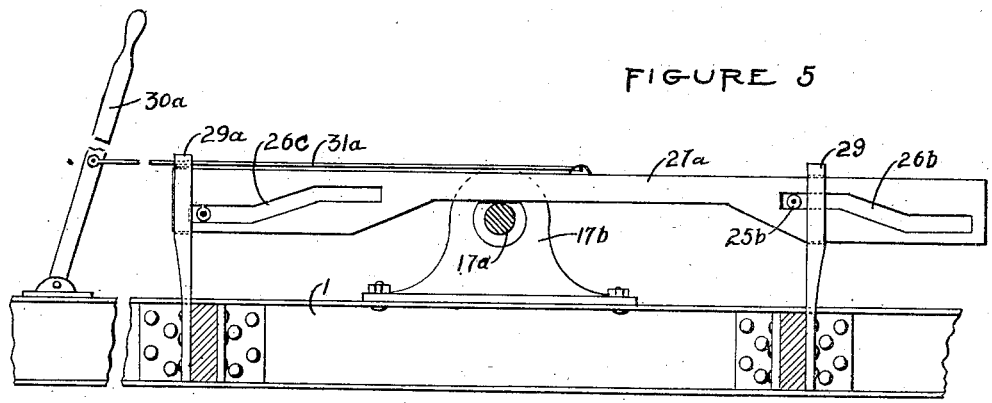
Fig. 5 is a sectional view on line C—C of Fig. 3.
Figure 3:
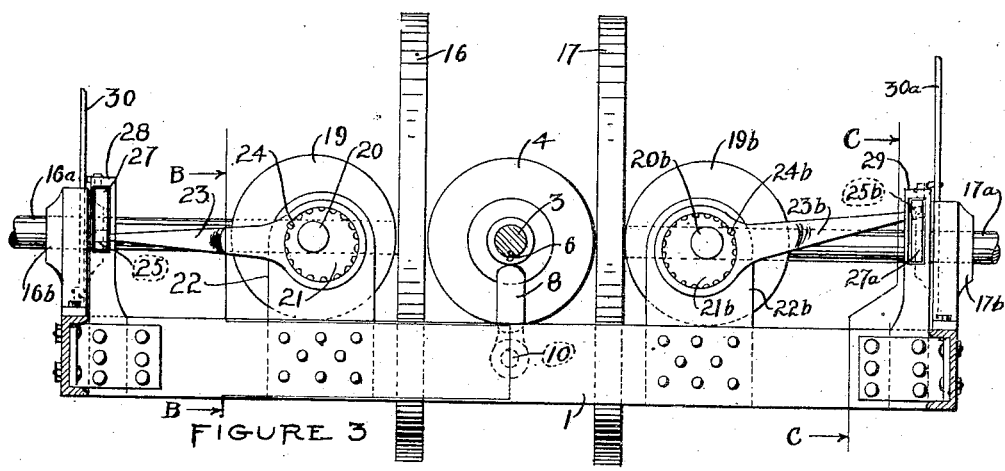
Fig. 3 is a sectional view on line A—A of Fig. 1.
Figure 4:
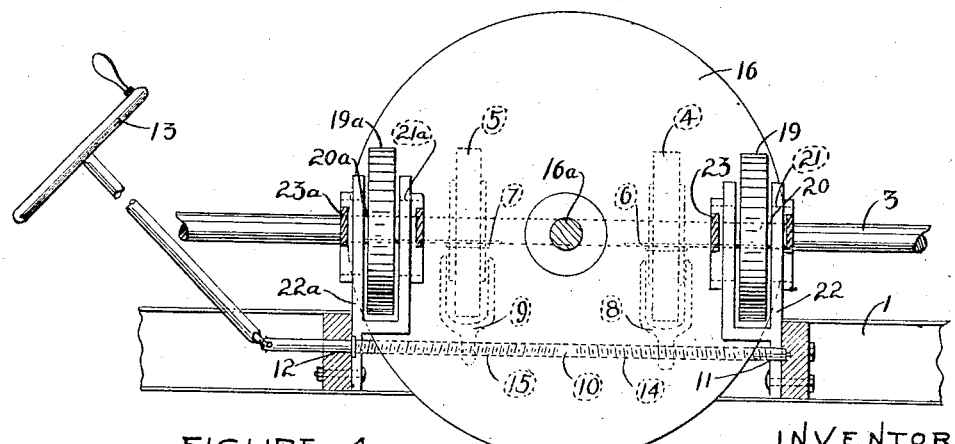
Fig. 4 is a sectional view on line B—B of Fig. 3.

If the shaft of one disk is geared to an internal gear on one tractor wheel and the shaft of the opposing disk is geared to a gear secured to the hub of the other tractor wheel, then the two shafts must revolve in opposite directions when the tractor is driven forward or backward and contact wheels 19 and 19ᵇ are thrown into use by using cam slides formed as shown at 34 and 35 in Fig. 9, slots 32 and 32ª being formed the same as slots 33 and 33ª.

It is understood, of course, that I do not wish to confine myself to the specific mechanism shown and described, but to cover broadly a frictional transmission mechanism embodying the characteristics herein set forth regardless of the detailed mechanism required to construct and operate the same. This driving mechanism may be applied equally as well to the caterpillar form of tractor as to the ordinary two wheel tractor shown.

Having thus described my invention, what I claim as new and desire to secure by Letters Patent, is:—

1. In a frictional transmission mechanism, the combination with a pair of opposed disks having a pair of slidably mounted friction wheels operatively positioned therebetween and on opposite sides of the axis thereof, of a pair of simultaneously adjustable idler pressure disks operatively positioned adjacent the outer surface of each of said opposed disks and on opposite sides of the axis thereof, and means for reversing the positions of the members of each pair of pressure disks thereby moving one of said members into contact with the adjacent opposed disk and the other member out of contact with said opposed disk.

2. In a frictional transmission mechanism, the combination with a pair of opposed disks having a pair of slidably mounted friction wheels operatively positioned therebetween and on opposite sides of the axis thereof, of a pair of simultaneously adjustable idler pressure disks operatively positioned adjacent the outer surface of each of said opposed disks and on opposite sides of the axis thereof, and means for simultaneously reversing the positions of the members of each pair of pressure disks.

3. The combination with a pair of adjustable idler pressure disks operatively positioned in a frictional transmission mechanism, of means for simultaneously adjusting the positions of said pressure disks, said means comprising an eccentric mounting for each of said pressure disks, an arm for each of said pressure disks, and a slidably mounted and manually operated angularly slotted bar adapted to engage the ends of said arms.

4. The combination with a pair of adjustable idler pressure disks operatively positioned in a frictional transmission mechanism, of means for simultaneously adjusting the positions of said pressure disks, said means comprising an eccentric mounting for each of said pressure disks, an arm for each of said pressure disks, and a slidably mounted slotted bar adapted to engage the ends of said arms, and means for sliding said bar.

5. The combination with a pair of adjustable idler pressure disks operatively positioned in a frictional transmission mechanism, of means for simultaneously adjusting the positions of said pressure disks, said means comprising an eccentric mounting for each of said pressure disks, an arm adjustably connected to each of said pressure disks, and a slidably mounted slotted bar adapted to engage the said arms, and means for sliding said bar.

6. The combination with a pair of adjustable idler pressure disks operatively positioned in a frictional transmission mechanism, of means for simultaneously adjusting the positions of said pressure disks, said means comprising an eccentric mounting for each of said pressure disks, an arm for each of said pressure disks, and a slidably mounted bar having reversed adjusting slots formed in the ends thereof adapted to engage said arms, and means for sliding said bar.

7. The combination with a pair of independently operable drive wheels having alined axes and having independently operable drive shafts operatively geared thereto, of a friction disk rigidly mounted on each of said shafts in parallel relation to each other, a pair of slidably mounted friction wheels operatively positioned therebetween and on the opposite sides of the axis thereof, a pair of simultaneously adjustable idler pressure disks operatively positioned adjacent the outer surface of each of said opposed disks and on opposite sides of the axis thereof, and means for simultaneously reversing the positions of the members of each pair of pressure disks.

8. In a frictional transmission mechanism, a pair of opposed disks having a pair of slidably mounted friction wheels operatively positioned therebetween and on opposite sides of the axis thereof, and a pair of adjustable idler pressure disks operatively positioned adjacent the outer surface of each of said opposed disks and on opposite sides of the axis thereof, in combination with means for simultaneously reversing the positions of the members of each pair of pressure disks.

In testimony whereof I have hereunto affixed my signature this 8th day of September, 1916.

ALFRED J. TRIGWELL.

Copies of this patent may be obtained for five cents each, by addressing the " Commissioner of Patents, Washington, D. C."